United States Patent
Minard

(10) Patent No.: US 9,719,830 B2
(45) Date of Patent: Aug. 1, 2017

(54) MULTI-CHAMBER CALIBRATION CUP FOR GAUGING A FOOD PRODUCT DISPENSING DEVICE

(71) Applicant: Carrier Commercial Refrigeration, Inc., Farmington, CT (US)

(72) Inventor: James J. Minard, Roscoe, IL (US)

(73) Assignee: CARRIER COMMERCIAL REFRIGERATION, INC., Farmington, CT (US)

(*) Notice: Subject to any disclaimer, the term of this patent is extended or adjusted under 35 U.S.C. 154(b) by 264 days.

(21) Appl. No.: 14/370,250

(22) PCT Filed: Dec. 28, 2012

(86) PCT No.: PCT/US2012/071958
§ 371 (c)(1),
(2) Date: Jul. 2, 2014

(87) PCT Pub. No.: WO2013/103590
PCT Pub. Date: Jul. 11, 2013

(65) Prior Publication Data
US 2015/0027201 A1    Jan. 29, 2015

Related U.S. Application Data

(60) Provisional application No. 61/583,216, filed on Jan. 5, 2012.

(51) Int. Cl.
*G01F 19/00* (2006.01)
*G01F 25/00* (2006.01)
(Continued)

(52) U.S. Cl.
CPC .......... *G01F 19/00* (2013.01); *G01F 19/005* (2013.01); *G01F 17/00* (2013.01); *G01F 23/266* (2013.01);
(Continued)

(58) Field of Classification Search
CPC ...................................................... G01F 19/00
(Continued)

(56) References Cited

U.S. PATENT DOCUMENTS 641,052 A    1/1900 Strauss
773,574 A    11/1904 Kossowski
(Continued)

FOREIGN PATENT DOCUMENTS

DE    3303443 A1    8/1984
GB    2457592    *   8/2009    ............... B67D 1/00
GB    2457592 A    8/2009

OTHER PUBLICATIONS

WIPO, International Premliminary Report on Patentability, Authorized Officer: Mineko Mohri, Jul. 8, 2014.*
(Continued)

*Primary Examiner* — Clayton E Laballe
*Assistant Examiner* — Kevin Butler
(74) *Attorney, Agent, or Firm* — Cantor Colburn LLP

(57) ABSTRACT

A calibration cup for use in calibrating a quantity of a dessert dispensed from a product dispensing machine includes a body portion having an interior cavity, the interior cavity including a first chamber adjacent to at least a second chamber being disposed along a longitudinal width of the body portion, the first and the at least one second chamber being configured for receiving a quantity of the dessert from the product dispensing machine; and at least one opening on the body portion, the at least one opening being configured for receiving a nozzle coupled to the product dispensing machine; where the body portion is configured for self-aligning the first chamber and the at least a second chamber to the product dispensing machine.

20 Claims, 3 Drawing Sheets

(51) Int. Cl.
  *G01F 23/26* (2006.01)
  *G01F 17/00* (2006.01)

(52) U.S. Cl.
  CPC ...... *G01F 25/0061* (2013.01); *G01F 25/0069* (2013.01)

(58) Field of Classification Search
  USPC .......................... 73/1.36, 1.73, 426, 427, 429
  See application file for complete search history.

(56) References Cited

U.S. PATENT DOCUMENTS

| | | | |
|---|---|---|---|
| D99,405 S | 4/1936 | Marschall | |
| 2,527,348 A * | 10/1950 | Berkower | G01F 19/00 73/429 |
| 2,648,981 A | 8/1953 | Drake, Jr. | |
| 2,712,396 A | 7/1955 | Mowat | |
| 2,753,990 A | 7/1956 | Chalfin et al. | |
| 3,215,299 A | 11/1965 | Coanda et al. | |
| 3,316,933 A | 5/1967 | Ajero | |
| 3,347,420 A | 10/1967 | Donoghue | |
| 3,358,886 A | 12/1967 | Provenza | |
| 3,859,854 A | 1/1975 | Dye et al. | |
| 3,877,877 A | 4/1975 | Prosen | |
| 3,888,236 A | 6/1975 | Marx | |
| 3,948,105 A | 4/1976 | Johnson, Jr. | |
| 4,109,530 A | 8/1978 | Kim | |
| 4,293,008 A * | 10/1981 | Coleman | B67D 1/08 141/325 |
| 4,409,845 A | 10/1983 | Stufflebam et al. | |
| 4,721,393 A | 1/1988 | Kwast | |
| 4,762,251 A * | 8/1988 | Berger | G01F 25/0092 116/321 |
| 4,876,891 A * | 10/1989 | Felt | G01F 19/00 128/200.23 |
| 5,406,995 A | 4/1995 | Gantzer | |
| D361,532 S * | 8/1995 | North, III | D10/46.3 |
| 5,447,245 A | 9/1995 | Merhar | |
| 5,758,540 A * | 6/1998 | Davila | B67D 1/08 73/426 |
| 5,833,097 A * | 11/1998 | Ruth | G01F 19/00 141/280 |
| D431,478 S | 10/2000 | Fortier | |
| 6,230,934 B1 * | 5/2001 | Kramer | G01F 13/006 222/1 |
| 6,363,783 B1 * | 4/2002 | Turner | G01F 25/0061 73/1.73 |
| 6,814,810 B2 * | 11/2004 | Prentice | H05K 13/0469 118/677 |
| 7,204,960 B2 * | 4/2007 | Hui | G01F 11/006 100/55 |
| 7,290,446 B2 | 11/2007 | Bingul et al. | |
| 7,437,930 B2 * | 10/2008 | Lasserre | A45D 19/02 222/105 |
| 8,387,455 B1 * | 3/2013 | Kaminski | G01F 23/265 73/304 C |
| 2003/0060994 A1 * | 3/2003 | Deng | A47J 31/402 702/105 |
| 2005/0160808 A1 * | 7/2005 | Bingul | G01F 19/00 73/426 |
| 2009/0205402 A1 * | 8/2009 | Jackson | G01F 1/007 73/1.73 |
| 2011/0189357 A1 * | 8/2011 | Herbert | A23G 9/045 426/231 |
| 2015/0027201 A1 * | 1/2015 | Minard | G01F 19/005 73/1.73 |

OTHER PUBLICATIONS

Minard, James, 'Multi-Chamber Calibration Cup for Gaughing a Food Product Dispersing Device', PCT/US2012/071958 International Preliminary Report on Patentability, Jan. 5 2012, 7 Pages.*
International Preliminary Report on Patentability and Written Opinion, for application PCT/US2012/071958, mailed Jul. 8, 2014, 7 pages.
International Search Report for application PCT/US2012/071958, mailed Mar. 19, 2013, 4 pages.

* cited by examiner

MULTI-CHAMBER CALIBRATION CUP FOR GAUGING A FOOD PRODUCT DISPENSING DEVICE

FIELD OF INVENTION

The subject matter disclosed herein relates generally to the field of measuring devices, and more particularly, to a multi-chamber calibration cup for calibrating desserts that self-aligns when attached to a product dispensing machine and provides for hands free use of the cup during calibration.

DESCRIPTION OF RELATED ART

Typically, a dessert product is dispensed from a product dispensing machine as a blend of a frozen mix and one or more syrups. To ensure that the dispensed product has a desirable taste, the ratio of volumes of syrup to that of the frozen mix is monitored and occasionally calibrated. Typically, a graduated measuring cup is used by placing a device known as a diverter tube from the dispensing machine into the measuring cup in order to provide for the flow of individual syrup into the cup chamber. The technician measures the syrup dispensing rate and adjusts the volume of syrup dispensed if more syrup or less syrup is dispensed for a determined time period. Improvements in a calibration cup that provides for calibrating multiple products dispensed would be well received in the art.

BRIEF SUMMARY

According to one aspect of the invention, a calibration cup for use in calibrating a quantity of a dessert dispensed from a product dispensing machine, includes a body portion having an interior cavity, the interior cavity including a first chamber adjacent to at least a second chamber being disposed along a longitudinal width of the body portion, the first and the at least one second chamber being configured for receiving a quantity of the dessert from the product dispensing machine; and at least one opening on the body portion, the at least one opening being configured for receiving a nozzle coupled to the product dispensing machine; where the body portion is configured for self-aligning the first chamber and the at least a second chamber to the product dispensing machine.

According to another aspect of the invention, a method of calibrating an amount of dessert dispensed from a product dispensing machine includes coupling a calibration cup to the product dispensing machine, receiving a defined quantity of the dessert in the calibration cup; and measuring the rate of the dessert dispensed for the defined quantity. The calibration cup includes a body portion having an interior cavity, the interior cavity including a first chamber adjacent to at least a second chamber being disposed along a longitudinal width of the body portion, the first and the at least one second chamber being configured for receiving a quantity of the dessert from the product dispensing machine; and at least one opening on the body portion, the at least one opening being configured for receiving a nozzle coupled to the product dispensing machine. Also, the body portion is configured for self-aligning the first chamber and the at least a second chamber to the product dispensing machine.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a multi-chamber calibration cup that couples to a plurality of dispensing valves on a product dispensing machine receives, in one embodiment, a dessert for calibration. In some non-limiting examples, the dessert includes syrups with or without particulate such as, for example, pieces of fruit or fruit fibers, yogurt, dairy, cream, custard, or other similar products. The calibration cup includes a rigid body for enclosing a plurality of chambers and having attachment features on a rear wall of the rigid body. The attachment features are oriented along the same axis and are configured for attaching the calibration cup to a complementary feature or features on the product dispenser. In embodiments, the alignment features may be disposed horizontally or vertically on the rear wall of the rigid body. The attachment features provide for self-aligning the calibration cup across the plurality of chambers and enables hands free usage of the cup during calibration of the dessert dispensed from the product dispensing machine.

Figure 1:
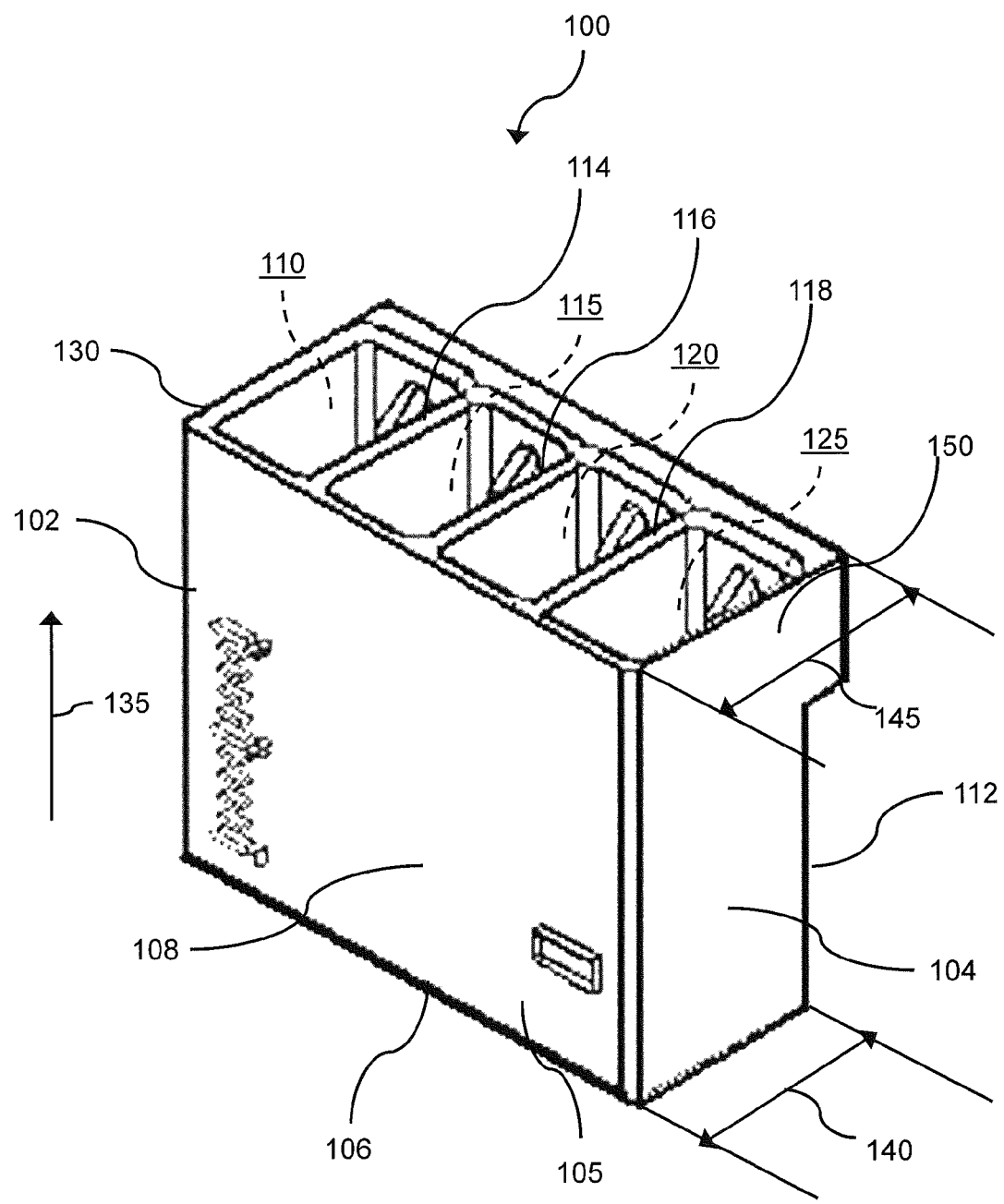
FIG. 1 illustrates a front perspective view of a multi-chamber calibration cup for a product dispensing machine according to an embodiment of the invention.

Referring now to the drawings, FIG. 1 illustrates a front perspective view of a multi-chamber calibration cup 100 including a plurality of chambers for calibrating a quantity of a dessert according to an embodiment of the invention. Particularly, the calibration cup 100 has a rigid rectangular shaped body 105 with, in one embodiment, four calibration chambers 110, 115, 120, and 125 disposed adjacent to each other in a horizontal orientation inside the body 105. In another embodiment, the calibration chambers such as, for example calibration chambers 110-125 may be vertically disposed on body 105. The calibrations chambers 110-125 are enclosed within sidewalls 102, 104, bottom wall 106, front wall 108, rear wall 112, and partitions 114, 116, and 118. Each calibration chamber 110, 115, 120, and 125 is shaped to dispose a separate and rectilinear, constant perimeter volume that extends upwardly from bottom wall 106 to end 130 in direction 135. Also, some or all of sidewalls 102-104, bottom wall 106, front wall 108, rear wall 112, and partitions 114-118 may be transparent or translucent in order to facilitate visual inspection of, in one example, the rate of dessert dispensed and contained within the calibration chambers 110-125. In some non-limiting examples, the dessert includes syrups with or without particulate such as, for example, pieces of fruit or fruit fibers, yogurt, dairy, cream, custard, or other similar products. Also, body 105 includes a first width 140 that substantially extends in direction 135 and terminates into an extended portion 150 having a second width 145. The portion 150 is provided for abutting a surface of the product dispensing machine in order to receive the one or more products dispensed into the calibration cup 100. It is to be appreciated that the several calibration chambers 110-125 are provided to perform individual calibrations of the dispensed rate of one or more desserts into the chambers 110-125. It is also to be appreciated that the calibration cup 100 may be provided from a molded assembly having the plurality of chambers 110-125, and more or less chambers may be provided without departing from the scope of the invention.

Figure 2:
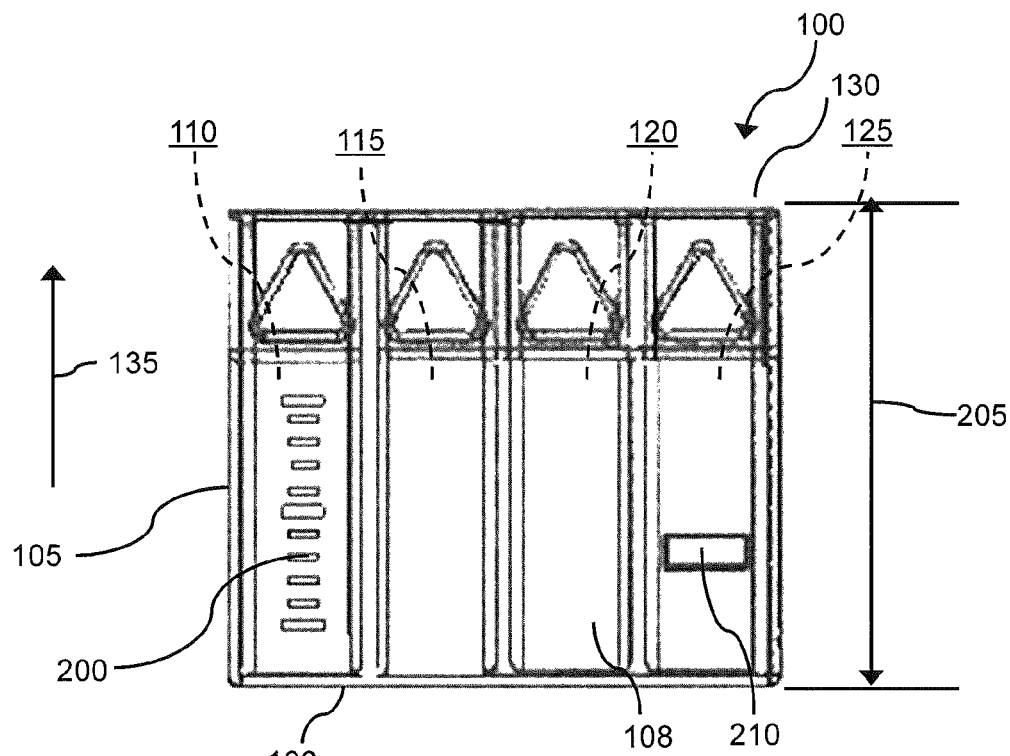
FIG. 2 illustrates a front elevation view of a multi-chamber calibration cup according to an embodiment of the invention.

FIG. 2 illustrates a front elevation view of the multi-chamber calibration cup 100 according to an embodiment of the invention. As shown, front wall 108 includes graduated lines or calibration marks 200 that are oriented along the longitudinal length of calibration chamber 110. In another non-limiting example, additional calibration marks, substantially similar to calibration mark 200, may be provided on the front wall 108 across each the calibration chamber 115-125. Also, front wall 108 includes a target window 210 for measuring the rate product dispensed into the calibration chambers 110-125. Additionally, front wall 108 includes a height 205 that emanates from bottom wall 106 and terminates at end 130. In operation, the calibration marks 200 and target window 210 provides ease of determining the volume of dessert dispensed into the chambers 110-125 for a pre-determined time as viewed from front wall 108.

Figure 3:
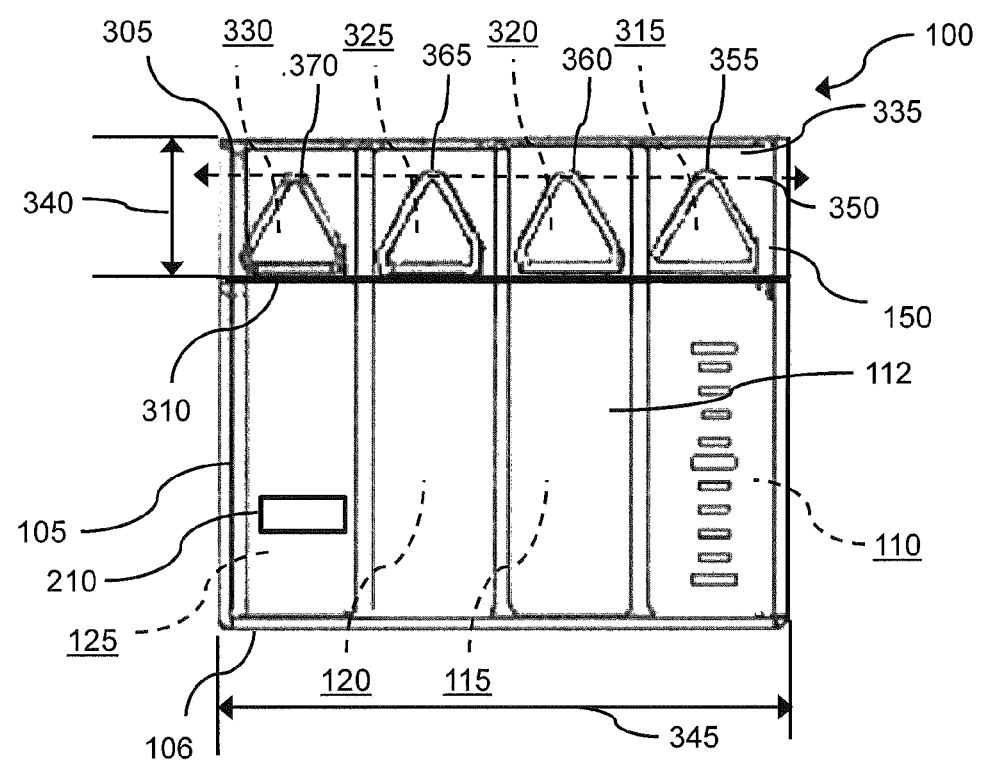
FIG. 3 illustrates a rear elevation view of the multi-chamber calibration cup according to an embodiment of the invention.

FIG. 3 illustrates a rear elevation view of the multi-chamber calibration cup 100 according to an embodiment of the invention. As shown, body 105 includes a rear wall 112 that emanates from bottom wall 106 and terminates into portion 150. Further, portion 150 is generally orthogonal to a tangent of rear wall 112 and includes "triangular-shaped" openings 315, 320, 325, 330 contained between top edge 305 and a bottom edge 310 of surface 335 for a height 340. The openings 315-330 are aligned horizontally along axis 350 (i.e., top vertices 355, 360, 365, 370 of respective openings 315-330 are aligned coaxially) and vertically along each respective calibration chamber 110-125 and extend substantially along the width 345 of body 105. The openings 315-330 align calibration chambers 110-125 of the calibration cup 100 with the nozzles 405 as the openings 315-330 receive dispensing nozzles 405 during calibration of the product dispensing machine, as is shown and described in more detail in FIG. 4. It is to be appreciated that, in another embodiment, a body 105 including vertically disposed openings may also be provided for aligning along the vertical direction.

Figure 4:
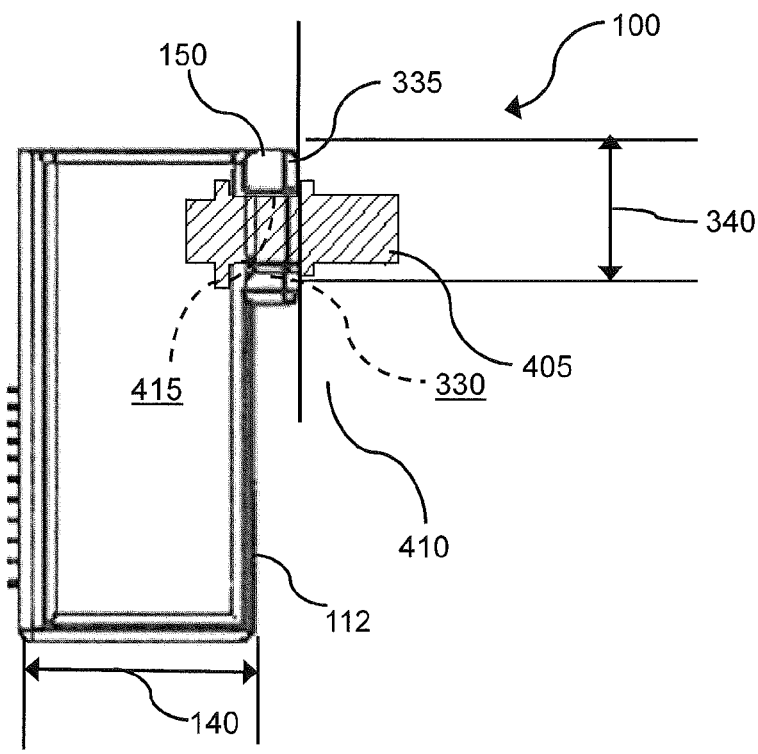
FIG. 4 illustrates a right side elevation view of the multi-chamber calibration cup according to an embodiment of the invention.

FIG. 4 illustrates a right side elevation view of the multi-chamber calibration cup 100 with a detailed view of portion 150 connected to a dispensing nozzle 405 according to an embodiment of the invention. Particularly, portion 150 has a height 340 and includes substantially similar openings 315, 320, 325, 330 (FIG. 3) which are provided to receive respective dispensing nozzles of product dispensing machine 410. Particularly, in an example, opening 330 is provided to receive nozzle 405 substantially within its top vertex 370 (FIG. 3) when calibration cup 100 is affixed to product dispensing machine 410 during calibration, causing vertex 370 (FIG. 3) to form an interference fit with the groove 415 and self-align the suspend calibration cup 100 by groove 415 below the respective dispensing nozzles. Additionally, portion 150 includes a width 145 (FIG. 1) at end 130 (FIG. 1) that is slightly greater than the width 140 at bottom wall 106 (FIG. 1), which causes surface 335 of portion 150 to extend beyond a plane parallel to the rear wall 112 and abut the exposed surface of dispensing machine 410 and further reinforcing the connection between the portion 150 and openings 315-330 (FIG. 3).

In operation and as shown in FIGS. 2-4, portion 150 (FIG. 3-4) provides for a stationary attachment point for calibration cup 100 by coupling the openings 315, 320, 325, 330 (FIG. 3) to the respective dispensing nozzles such as, for example nozzle 405 (FIG. 4), in order to attach the calibration cup 100 to product dispensing machine 410 (FIG. 4). The openings 315, 320, 325, 330 (FIG. 3) cooperate with the dispensing nozzles in order to provide for hands-free calibration of a quantity of a dessert dispensed from the dispensing machine 410 (FIG. 4). A technician would utilize the calibration cup 100 by attaching the cup 100 to the machine 410 (FIG. 4) and push a button (not shown) on dispensing machine 410 (FIG. 4) to actuate a nozzle 405 (FIG. 4) and dispense the dessert into one of the chambers 110, 115, 120, 125 (FIG. 3) while closely monitoring the respective calibration marks 200 that lie on the boundary of the calibration chambers 110-125 (FIG. 3). In an embodiment, when 1 ounce of dessert is dispensed, the technician would push the button to stop the machine 410 from dispensing the dessert and calculate the rate of dessert dispensed from the machine 410 for the dispensed time that is provided by the machine 410 by evaluating the dessert as viewed against the calibration marks 200 and adjust the rate accordingly. In another embodiment, the technician may also determine the rate of dessert dispensed by viewing the target window 210 (FIG. 2-3) after a predetermined time to determine if the dessert level is within the target window 210 (FIG. 2-3), and may adjust the rate of product dispensed if not within the window 210 (FIG. 2-3). In other embodiments, the machine 410 may adjust the quantity of a dessert dispensed after the technician enters the quantity of dessert that is dispensed in the time determined by the machine 410 (FIG. 4).

Figure 5:
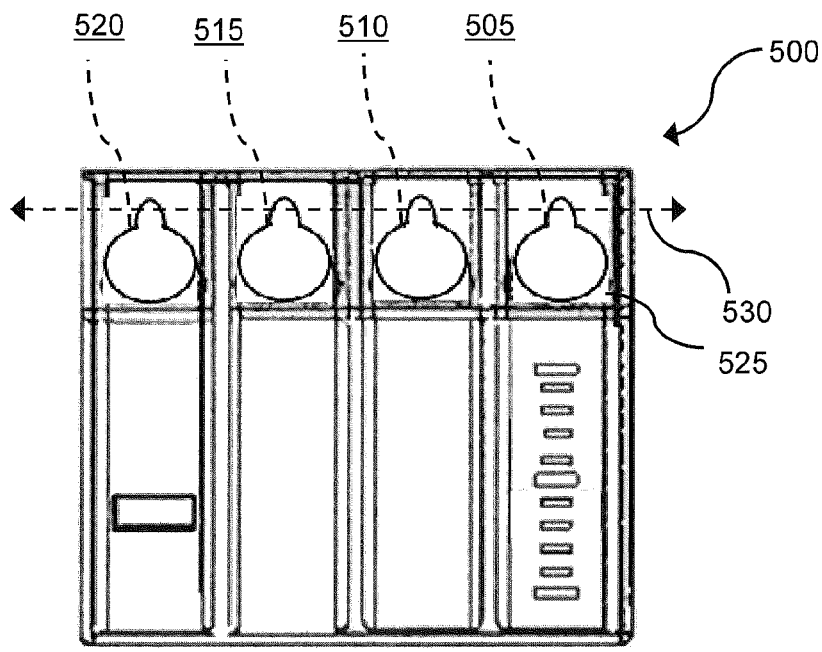
FIG. 5 illustrates a rear elevation view of a multi-chamber calibration cup according to an embodiment of the invention.

As shown in FIG. 5, calibration cup 500 includes, in one embodiment, a plurality of "key-shaped" openings 505, 510, 515, 520 while all other features of calibration cup 500 are substantially the same as the calibration cup 100 shown and described with reference to FIGS. 1-4. Particularly, portion 525, which is substantially similar to portion 150 of FIG. 1, includes openings 505-520 that are contained within the opening 525. The openings 505-520 are aligned horizontally along axis 530 and vertically along each respective calibration chamber 505-520. The openings 505 520 self-align the calibration cup 500 to the respective dispensing nozzles during calibration of the product dispensing machine.

The technical effects and benefits of exemplary embodiments include a multi-chamber calibration cup for calibration of at least one dessert and is coupled to a plurality of dispensing valves on a product dispensing machine. The calibration cup has attachment features that are oriented along the same axis and are configured for attaching the calibration cup to a complementary feature or features on the product dispensing machine thereby self-aligning the cup and providing for hands-free usage of the calibration cup.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A calibration cup for use in calibrating a quantity of a dessert dispensed from a product dispensing machine, comprising:
   a body portion having an interior cavity, the interior cavity including a first chamber adjacent to at least a second chamber being disposed along a longitudinal width of the body portion, the first and the at least one second chamber being configured for receiving a quantity of the dessert from the product dispensing machine; and
   at least two openings on the body portion, the at least two openings configured to receive nozzles of the product dispensing machine to attach the calibration cup to the product dispensing machine;
   wherein the body portion is configured for self-aligning the first chamber and the at least a second chamber to the product dispensing machine.

2. The calibration cup of claim 1, wherein the body portion further comprises a front wall, a rear wall, a bottom wall, and a top opening directly opposed to the bottom wall.

3. The calibration cup of claim 1, wherein the at least two openings are configured for orienting the body portion horizontally along the longitudinal width.

4. The calibration cup of claim 1, wherein the at least two openings are configured for orienting the body portion vertically to the longitudinal width.

5. The calibration cup of claim 1, further comprising at least one set of calibration marks aligned vertically to the longitudinal width of the body portion.

6. The calibration cup of claim 5, wherein the distance between a first and second calibration mark of the at least one set of calibration marks defines a predetermined quantity of the product.

7. The calibration cup of claim 6, further comprising a target window for determining the predetermined quantity of the dessert.

8. The calibration cup of claim 7, wherein the at least two openings are configured for hands-free usage of the calibration cup during calibration of an amount of the dessert dispensed from the product dispensing machine.

9. A calibration cup for use in calibrating a quantity of a dessert dispensed from a product dispensing machine, comprising:
   a body portion having an interior cavity, the interior cavity including a first chamber adjacent to at least a second chamber being disposed along a longitudinal width of the body portion, the first and the at least one second chamber being configured for receiving a quantity of the dessert from the product dispensing machine; and
   at least one opening on the body portion, the at least one opening being configured for receiving a nozzle coupled to the product dispensing machine;
   wherein the body portion is configured for self-aligning the first chamber and the at least a second chamber to the product dispensing machine;
   wherein the body portion further comprises a front wall, a rear wall, a bottom wall, and a top opening directly opposed to the bottom wall;
   wherein the rear wall further comprises an extended portion with a surface configured with the at least one opening.

10. A calibration cup for use in calibrating a quantity of a dessert dispensed from a product dispensing machine, comprising:
    a body portion having an interior cavity, the interior cavity including a first chamber adjacent to at least a second chamber being disposed along a longitudinal width of the body portion, the first and the at least one second chamber being configured for receiving a quantity of the dessert from the product dispensing machine; and
    at least one opening on the body portion, the at least one opening being configured for receiving a nozzle coupled to the product dispensing machine;
    wherein the body portion is configured for self-aligning the first chamber and the at least a second chamber to the product dispensing machine;
    wherein the at least one opening is key-shaped or triangular shaped for the self-aligning of the body portion to the nozzle.

11. A method of calibrating an amount of dessert dispensed from a product dispensing machine, comprising:
    coupling a calibration cup to the product dispensing machine, wherein the calibration cup further comprises:
    a body portion having an interior cavity, the interior cavity including a first chamber adjacent to at least a second chamber being disposed along a longitudinal width of the body portion, the first and the at least one second chamber being configured for receiving a quantity of the dessert from the product dispensing machine; and
    at least two openings on the body portion, the at least two openings configured to receive nozzles of the product dispensing machine;
    wherein the body portion is configured for self-aligning the first chamber and the at least a second chamber to the product dispensing machine;
    attaching the calibration cup to the product dispensing machine by placing the nozzles of the product dispensing machine in the at least two openings;
    receiving a defined quantity of the dessert in the calibration cup; and
    measuring the rate of the dessert dispensed for the defined quantity.

12. A method of calibrating an amount of dessert dispensed from a product dispensing machine, comprising:
    coupling a calibration cup to the product dispensing machine, wherein the calibration cup further comprises:
    a body portion having an interior cavity, the interior cavity including a first chamber adjacent to at least a second chamber being disposed along a longitudinal width of the body portion, the first and the at least one second chamber being configured for receiving a quantity of the dessert from the product dispensing machine; and
    at least one opening on the body portion, the at least one opening configured to receive a nozzle of the product dispensing machine;
    wherein the body portion is configured for self-aligning the first chamber and the at least a second chamber to the product dispensing machine;
    attaching the calibration cup to the product dispensing machine by placing the nozzle of the product dispensing machine in the opening;
    receiving a defined quantity of the dessert in the calibration cup;
    measuring the rate of the dessert dispensed for the defined quantity; and measuring the rate by dispensing an amount of the dessert for a predetermined time and comparing the amount to the predetermined time.

13. The method of claim 11, wherein the body portion further comprises a front wall, a rear wall, a bottom wall, and a top opening directly opposed to the bottom wall.

14. The method of claim 11, wherein the at least two openings configured for orienting the body portion horizontally along the longitudinal width.

15. The method of claim 11, wherein the at least two openings are configured for orienting the body portion vertically to the longitudinal width.

16. The method of claim 11, wherein the body portion includes at least one set of calibration marks that are aligned vertically to the longitudinal width of the body portion.

17. The method of claim 16, wherein a distance between a first and second calibration mark of the at least one set of calibration marks corresponds to the defined quantity.

18. The method of claim 17, further comprising determining the defined quantity with a target window in the body portion.

19. The method of claim 18, further comprising using the calibration cup for hands-free usage of the calibration cup during calibration of an amount of the product dispensed from the product dispensing machine.

20. A method of calibrating an amount of dessert dispensed from a product dispensing machine, comprising:
coupling a calibration cup to the product dispensing machine, wherein the calibration cup further comprises:
a body portion having an interior cavity, the interior cavity including a first chamber adjacent to at least a second chamber being disposed along a longitudinal width of the body portion, the first and the at least one second chamber being configured for receiving a quantity of the dessert from the product dispensing machine; and
at least one opening on the body portion, the at least one opening being configured for receiving a nozzle coupled to the product dispensing machine;
wherein the body portion is configured for self-aligning the first chamber and the at least a second chamber to the product dispensing machine;
receiving a defined quantity of the dessert in the calibration cup; and measuring the rate of the dessert dispensed for the defined quantity;
self-aligning the body portion to the nozzle with the at least one opening, wherein the at least one opening is key-shaped or triangular shaped.

* * * * *